United States Patent
Singh et al.

(10) Patent No.: US 11,541,548 B2
(45) Date of Patent: *Jan. 3, 2023

(54) ARTIFICIAL INTELLIGENCE-BASED PROCESS IDENTIFICATION, EXTRACTION, AND AUTOMATION FOR ROBOTIC PROCESS AUTOMATION

(71) Applicant: UiPath, Inc., New York, NY (US)

(72) Inventors: Prabhdeep Singh, Bellevue, WA (US); Christian Berg, Seattle, WA (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,219

(22) Filed: Oct. 20, 2021

(65) Prior Publication Data
US 2022/0032470 A1    Feb. 3, 2022

Related U.S. Application Data

(63) Continuation of application No. 16/707,564, filed on Dec. 9, 2019, now Pat. No. 11,440,201.
(Continued)

(51) Int. Cl.
*B25J 13/00*    (2006.01)
*G06F 16/23*    (2019.01)
*G06N 3/04*    (2006.01)

(52) U.S. Cl.
CPC ........ *B25J 13/006* (2013.01); *G06F 16/2379* (2019.01); *G06N 3/04* (2013.01)

(58) Field of Classification Search
CPC ....... B25J 13/006; G06F 16/2379; G06N 3/04
See application file for complete search history.

(56) References Cited

U.S. PATENT DOCUMENTS 8,930,959 B2 *    1/2015    Lahr ................... G06K 9/6262
                                                      719/310
9,555,544 B2      1/2017    Bataller et al.
(Continued)

FOREIGN PATENT DOCUMENTS

IN    201841032794 A    9/2019
JP    2019049899 A      3/2019
(Continued)

OTHER PUBLICATIONS

Joseph "How to Scale RPA Beyond a Pilot", Verint Connect, Joseph, Jun. 29, 2019, https://connect.verint.com/b/customer-engagement/posts/how-to-scale-rpa-beyond-a-pilot (2019).
(Continued)

*Primary Examiner* — Angelica Ruiz
(74) *Attorney, Agent, or Firm* — LeonardPatel PC; Michael A. Leonard, II; Sheetal S. Patel

(57) ABSTRACT

Artificial intelligence (AI)-based process identification, extraction, and automation for robotic process automation (RPA) is disclosed. Listeners may be deployed to user computing systems to collect data pertaining to user actions. The data collected by the listeners may then be sent to one or more servers and be stored in a database. This data may be analyzed by AI layers to recognize patterns of user behavioral processes therein. These recognized processes may then be distilled into respective RPA workflows and deployed to automate the processes.

20 Claims, 9 Drawing Sheets

Related U.S. Application Data

(60) Provisional application No. 62/915,340, filed on Oct. 15, 2019.

(56) References Cited

U.S. PATENT DOCUMENTS

| | | | |
|---|---|---|---|
| 10,324,457 | B2 | 6/2019 | Neelakandan et al. |
| 10,339,027 | B2 | 7/2019 | Garcia et al. |
| 10,365,799 | B2 | 7/2019 | Hosbettu et al. |
| 2006/0129367 | A1 | 6/2006 | Mishra et al. |
| 2015/0213065 | A1 | 7/2015 | Sisk et al. |
| 2015/0244730 | A1* | 8/2015 | Vu .................... G06F 21/55 726/24 |
| 2017/0052824 | A1 | 2/2017 | Sharma et al. |
| 2017/0060108 | A1 | 3/2017 | Kakhandiki et al. |
| 2017/0206064 | A1 | 7/2017 | Breazeal et al. |
| 2017/0228119 | A1 | 8/2017 | Hosbettu et al. |
| 2017/0372442 | A1* | 12/2017 | Mejias ................. G16H 40/20 |
| 2018/0053117 | A1 | 2/2018 | Caffrey |
| 2018/0074931 | A1 | 3/2018 | Garcia et al. |
| 2018/0113781 | A1 | 4/2018 | Kim et al. |
| 2018/0197123 | A1 | 7/2018 | Parimelazhagan et al. |
| 2018/0329399 | A1 | 11/2018 | Neelakandan et al. |
| 2018/0341688 | A1 | 11/2018 | Ganesh et al. |
| 2018/0345489 | A1 | 12/2018 | Allen, IV et al. |
| 2018/0370029 | A1 | 12/2018 | Hall et al. |
| 2018/0370033 | A1 | 12/2018 | Geffen et al. |
| 2018/0373580 | A1 | 12/2018 | Ertl et al. |
| 2018/0374051 | A1 | 12/2018 | Li et al. |
| 2019/0116387 | A1 | 4/2019 | Anderson et al. |
| 2019/0124100 | A1 | 4/2019 | Shannon et al. |
| 2019/0126463 | A1 | 5/2019 | Purushothaman |
| 2019/0141125 | A1 | 5/2019 | Ogrinz et al. |
| 2019/0155225 | A1 | 5/2019 | Kothandaraman et al. |
| 2019/0180746 | A1 | 6/2019 | Diwan et al. |
| 2019/0244149 | A1 | 8/2019 | Krishnaswamy |
| 2019/0266254 | A1 | 8/2019 | Blumenfeld et al. |
| 2019/0286736 | A1 | 9/2019 | Sturtivant |
| 2019/0332508 | A1 | 10/2019 | Goyal et al. |
| 2019/0392949 | A1 | 12/2019 | Schermeier et al. |
| 2020/0065334 | A1 | 2/2020 | Rodriguez et al. |
| 2020/0287992 | A1 | 9/2020 | Berg et al. |
| 2021/0109503 | A1 | 4/2021 | Singh et al. |
| 2021/0110256 | A1 | 4/2021 | Singh et al. |
| 2021/0110318 | A1 | 4/2021 | Singh et al. |

FOREIGN PATENT DOCUMENTS

| | | |
|---|---|---|
| WO | 2017223083 A1 | 12/2017 |
| WO | 2019195121 A1 | 10/2019 |

OTHER PUBLICATIONS

Scott M Ross, "Non-Final Office Action", dated Mar. 17, 2022, U.S. Appl. No. 16/707,763.
Celonis "What is Task Mining?" page available at https://www.celonis.com/process-mining/what-is-task-mining/#record-interactions (last accessed Dec. 6, 2019).
Di Bisceglie et al., "Data-driven Insights to Robotic Process Automation with Process Mining," Compact 2019 3 available at (last accessed Dec. 6, 2019).
International Search Report and Written Opinion of the International Search Authority issued by the Korean Intellectual Property Office (KIPO) dated Nov. 23, 2020.
International Search Report and Written Opinion of the International Search Authority issued by the Korean Intellectual Property Office (KIPO) dated Nov. 27, 2020.
International Search Report and Written Opinion of the International Search Authority issued by the Korean Intellectual Property Office (KIPO) dated Dec. 1, 2020.
International Search Report and Written Opinion of the International Search Authority issued for PCT Application No. PCT/US2020/046071 dated Dec. 14, 2020.
Ki-Bong Kim, "A Study of Convergence Technology in Robotic Process Automation for Task Automation," Journal of Convergence for Information Technology, vol. 9. No. 7, pp. 8-13, ISSN 2586-4440, DOI: https://doi.org/10.22156/CS4SMB.2019.9.7.008 (Jul. 2019).
Angelica Ruiz, "Corrected Notice of Allowability", dated Aug. 17, 2022, U.S. Appl. No. 16/707,564.
Angelica Ruiz, "Notice of Allowance", dated Jun. 24, 2022, U.S. Appl. No. 16/707,564.
Charles E Anya, "Non-Final Office Action", dated Jun. 24, 2022, U.S. Appl. No. 16/708,036.
Jean Bruner Jeanglaude, "Non-Final Office Action", dated Jul. 12, 2022, U.S. Appl. No. 16/707,705.
Jean Bruner Jeanglaude, "Notice of Allowance", dated Sep. 13, 2022, U.S. Appl. No. 16/707,705.
Charles E Anya, "Final Office Action", dated Sep. 19, 2022, U.S. Appl. No. 16/708,036.
Jean Bruner Jeanglaude, "Corrected Notice of Allowability", dated Sep. 21, 2022, U.S. Appl. No. 16/707,705.
Scott M Ross, "Final Office Action", dated Sep. 19, 2022, U.S. Appl. No. 16/707,763.

* cited by examiner

ARTIFICIAL INTELLIGENCE-BASED PROCESS IDENTIFICATION, EXTRACTION, AND AUTOMATION FOR ROBOTIC PROCESS AUTOMATION

CROSS REFERENCE TO RELATED APPLICATIONS

This application is a continuation of, and claims the benefit of, U.S. patent application Ser. No. 16/707,564 filed Dec. 9, 2019, which claims the benefit of, and priority to, U.S. Provisional Patent Application No. 62/915,340 filed Oct. 15, 2019. The subject matter of these earlier filed applications is hereby incorporated by reference in their entirety.

FIELD

The present invention generally relates to robotic process automation (RPA), and more specifically, to artificial intelligence (AI)-based process identification, extraction, and automation for RPA.

BACKGROUND

Businesses may or may not be aware of processes that could benefit from RPA. Employees perform various tasks that are likely not directly known by the employer, and these tasks may be repetitive or otherwise candidates for being automated. Furthermore, businesses may have an idea of what they would like to automate, but not know the best workflow(s) to achieve that automation. While a log of user actions could be generated by a human reviewing a video recording, for example, this does not effectively capture precisely what a user is doing and is too expensive and time consuming to be practical and effective. Furthermore, the reviewer's account of what is occurring may not be accurate (e.g., the reviewer may misidentify the application that a user is using at a given time). Accordingly, an improved mechanism for identifying beneficial automations, improving planned or existing automations, or both, may be beneficial.

SUMMARY

Certain embodiments of the present invention may provide solutions to the problems and needs in the art that have not yet been fully identified, appreciated, or solved by current RPA techniques. For example, some embodiments of the present invention pertain to AI-based process identification, extraction, and automation for RPA.

In an embodiment, a system includes a server and a plurality of user computing systems including respective listener applications. The listener applications are configured to generate logs including user interactions with their respective user computing systems and send the log data from the logs to the server. The server is configured to access log data collected from the listeners and run the log data through at least one AI layer. The at least one AI layer is configured to process the log data and identify a potential RPA process therein. The server is then configured to automatically generate a workflow including the identified RPA process.

In another embodiment, a computer program is embodied on a nontransitory computer-readable medium. The program is configured to cause at least one processor to access log data collected from respective listener applications of a plurality of user computing systems. The program is also configured to cause the at least one processor to run the log data through at least one AI layer. The at least one AI layer is configured to process the log data and identify a potential RPA process therein. The program is further configured to cause the at least one processor to automatically generate an RPA workflow including the identified RPA process.

In yet another embodiment, a computer-implemented method includes generating, by a listener, a log including user interactions with a user computing system and sending log data from the log to a server, by the listener. The log data includes where a user clicks on a screen and in which application, keystrokes, which button was clicked, instances of the user switching between applications, focus changes, that an email was sent and what the email pertains to, or any combination thereof. Additionally, the computer-implemented method includes using the one or more extracted processes to generate one or more respective workflows and robots.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to AI-based process identification, extraction, and automation for RPA. Listeners may be deployed to user computing systems to collect data pertaining to user actions. The data collected by the listeners may then be sent to one or more servers and be stored in a database. This data may be analyzed by AI layers to recognize patterns of user behavioral processes therein. These recognized processes may then be distilled into respective RPA workflows and deployed to automate the processes.

These multiple layers of intelligence may thus facilitate the discovery of new processes to automate and the improvement of already existing and deployed processes. Thus, some embodiments function as a "process miner" to find processes users perform that are good candidates for automation and then automate these processes. In certain embodiments, the users may not be aware that the processes are being extracted and automated, and the data collection and automation may occur without any actions by the users.

Figure 1:
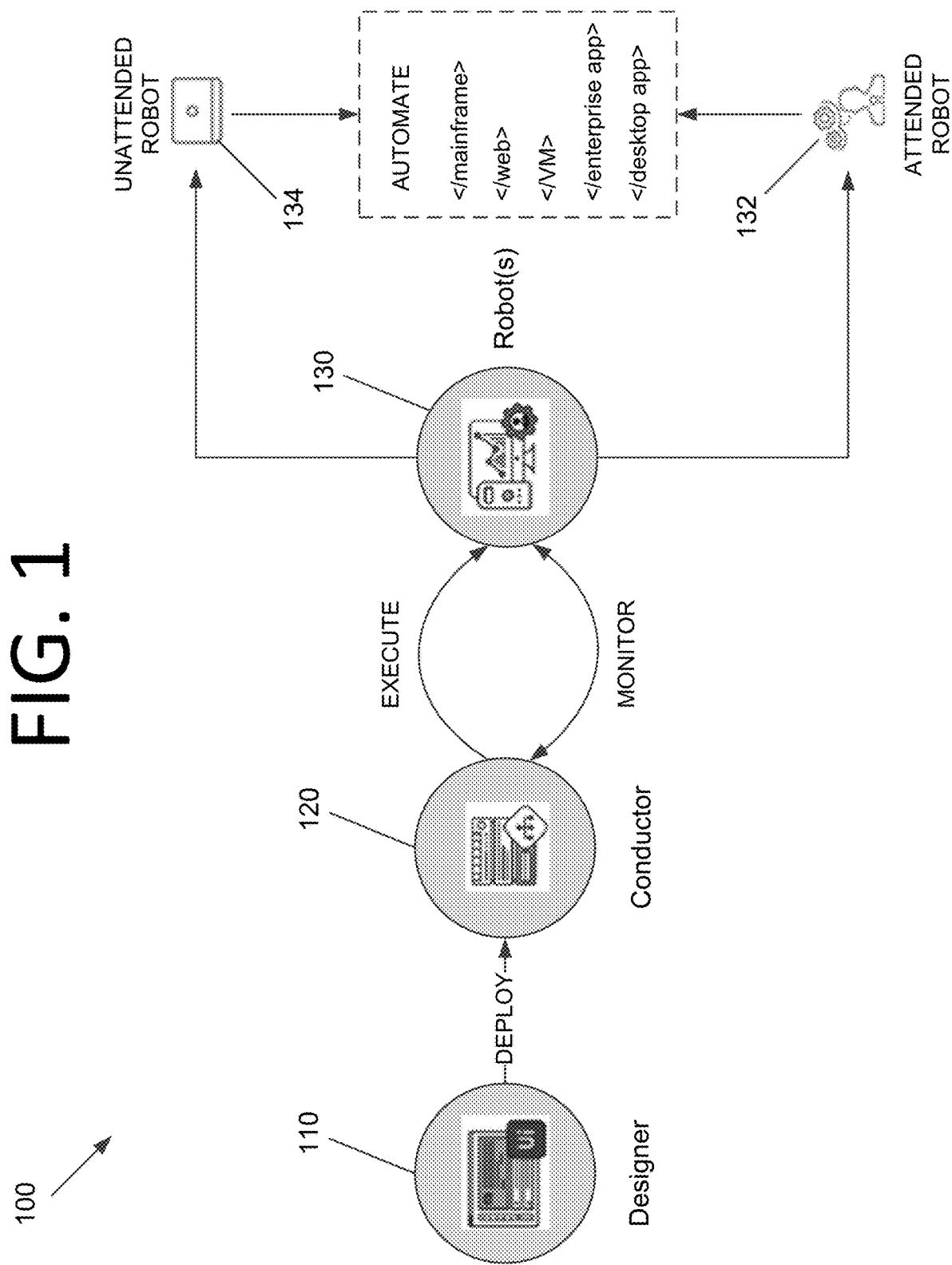
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
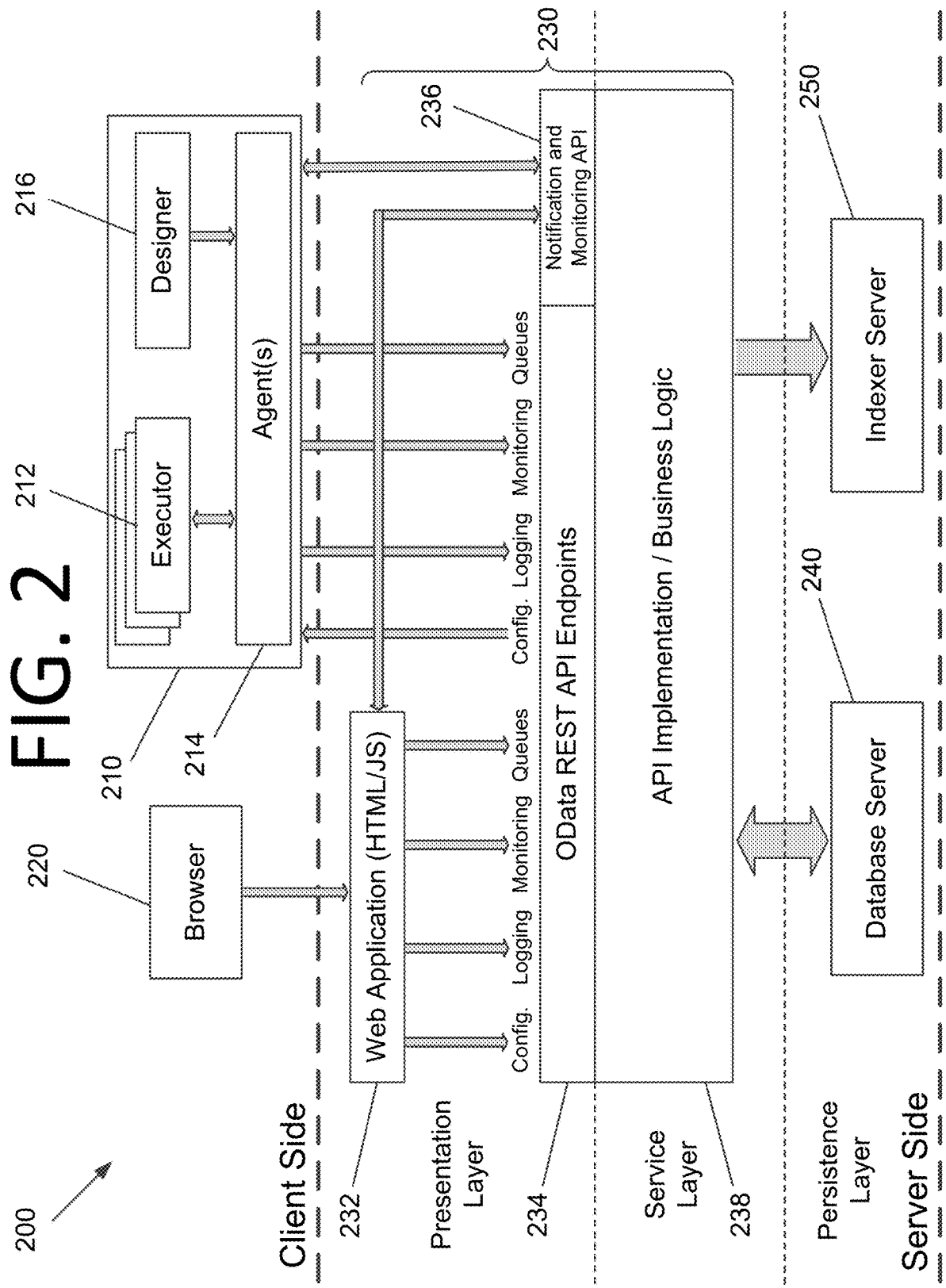
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running business processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), there may be multiple robots running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a Web Socket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
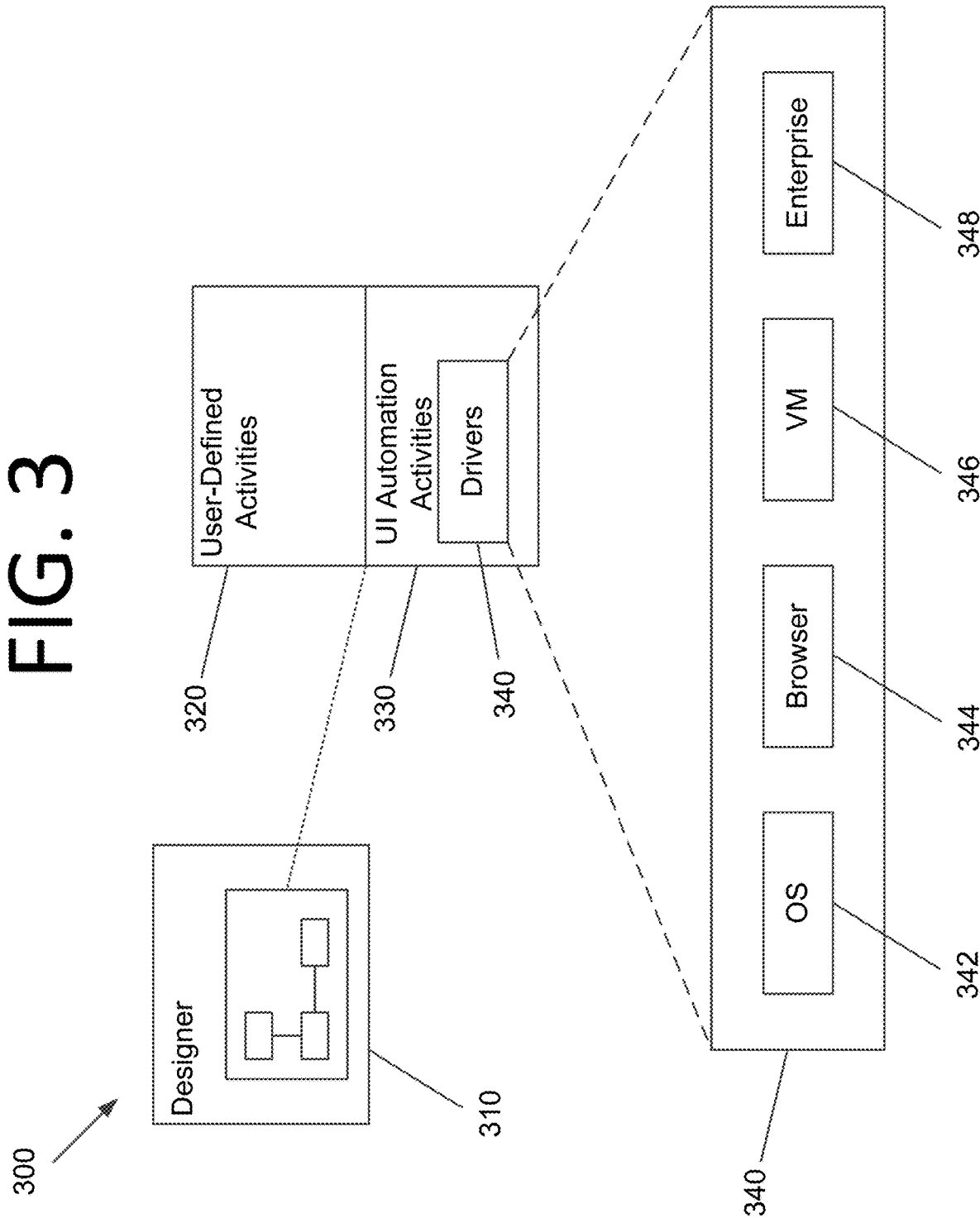
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
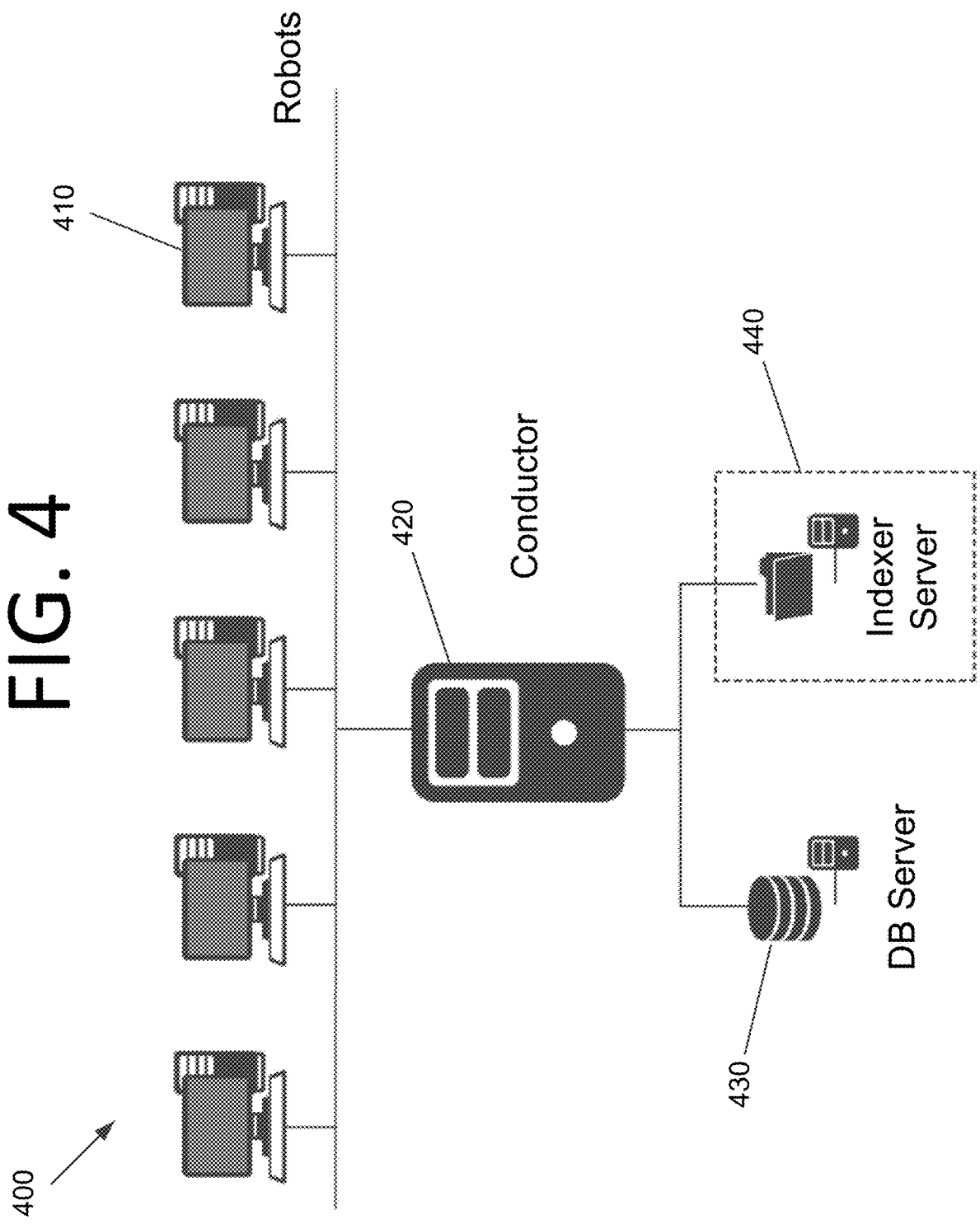
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
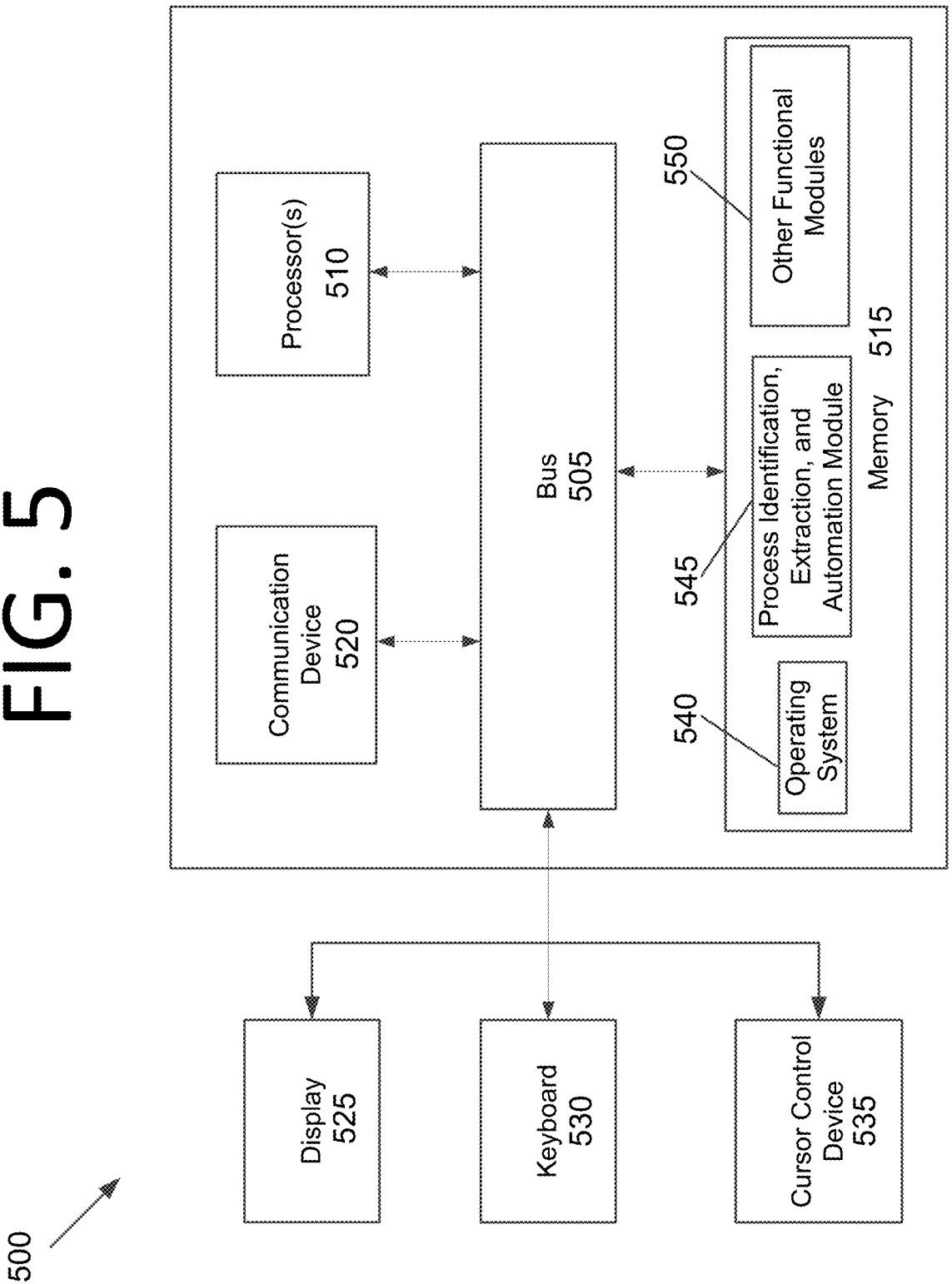
FIG. 5 is an architectural diagram illustrating a computing system configured to perform AI-based process identification, extraction, and/or automation for RPA, according to an embodiment of the present invention.

FIG. 5 is an architectural diagram illustrating a computing system 500 configured to perform AI-based process identification, extraction, and/or automation for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a process identification, extraction, and automation module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
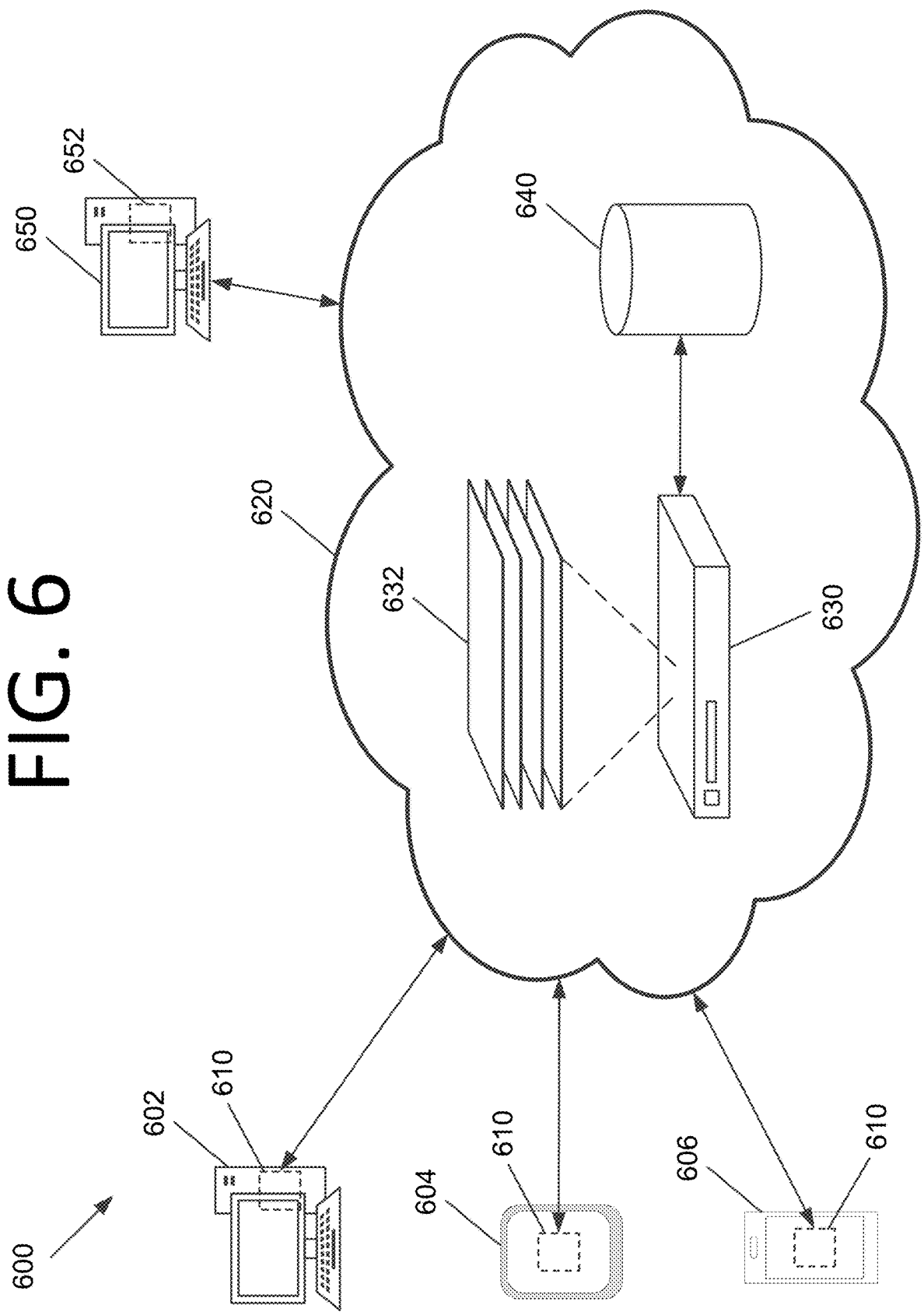
FIG. 6 is an architectural diagram illustrating a system configured to perform AI-based process identification, extraction, and automation for RPA, according to an embodiment of the present invention.

FIG. 6 is an architectural diagram illustrating a system 600 configured to perform AI-based process identification, extraction, and automation for RPA, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, Internet-of-Things (IoT) devices, vehicle computing systems, etc.

Each computing system 602, 604, 606 has a listener 610 installed thereon. Listeners 610 may be robots generated via an RPA designer application, part of an operating system, a downloadable application for a personal computer (PC) or smart phone, or any other software and/or hardware without deviating from the scope of the invention. Indeed, in some embodiments, the logic of one or more of listeners 610 is implemented partially or completely via physical hardware.

Listeners 610 generate logs of user interactions with the respective computing system 602, 604, 606 and send the log data via a network 620 (e.g., a local area network (LAN), a mobile communications network, a satellite communications network, the Internet, any combination thereof, etc.) to a server 630. The data that is logged may include, but is not limited to, which buttons were clicked, where a mouse was moved, the text that was entered in a field, that one window was minimized and another was opened, the application associated with a window, etc. In some embodiments, server 630 may run a conductor application and the data may be sent periodically as part of the heartbeat message. In certain embodiments, the log data may be sent to server 630 once a predetermined amount of log data has been collected, after a predetermined time period has elapsed, or both. Server 630 stores the received log data from listeners 610 in a database 640.

When instructed by a human user (e.g., an RPA engineer or a data scientist), when a predetermined amount of log data has been collected, when a predetermined amount of time has passed since the last analysis, etc., server 630 accesses log data collected from various users by listeners 610 from database 640 and runs the log data through multiple AI layers 632. AI layers 632 process the log data and identify one or more potential processes therein. AI layers 632 may perform statistical modeling (e.g., hidden Markov models (HMIs)) and utilize deep learning techniques (e.g., long short term memory (LSTM) deep learning, encoding of previous hidden states, etc.) and perform case identification to identify an atomic instance of a process. For invoice processing, for example, completion of one invoice may be a case. The system thus determines where one case finishes and the next case begins. Opening an email may be the start of a case, for example, and the patterns of the cases may be analyzed to determine variations and commonalities.

In some embodiments, identified processes may be listed for a user to peruse, and may be sorted by various factors including, but not limited to, an RPA score indicating how suitable a given process is to RPA (e.g., based on complexity of the automation, execution time, perceived benefit to key performance indicators such as revenue generated, revenue saved, time saved, etc.), process name, total recording time, the number of users who executed the process, process execution time (e.g., least or most time), etc. The process workflow may be displayed when a user clicks on a given process, including steps, parameters, and interconnections. In certain embodiments, only process activities that appear to be important from a clustering perspective may be used.

If a similar process already exists, server 630 may identify this similarity and know that the identified process should replace an existing process for a similar automation that works less optimally. For example, similarities between processes may be determined by a common beginning and end and some amount of statistical commonality in the steps taking in between. Commonality may be determined by entropy, minimization of a process detection objective function, etc. The objective function threshold may be set automatically in some embodiments, and this may be modified during training if processes that were identified as dissimilar by the system are indicated as being similar by a user. Server 630 may then automatically generate a workflow including the identified process, generate a robot implementing the workflow (or a replacement robot), and push the generated robot out to user computing systems 602, 604, 606 to be executed thereon.

Alternatively, in certain embodiments, suggested processes from AI layers 632 may be presented to an RPA engineer via a designer application 652 on a computing system 650. The RPA engineer can then review the workflow, make any desired changes, and then deploy the workflow via a robot to computing systems 602, 604, 606, or cause the robot to be deployed. For example, deployment may occur via a conductor application running on server 630 or another server, which may push a robot implementing the process out to user computing systems 602, 604, 606. In some embodiments, this workflow deployment may be realized via automation manager functionality in the designer application, and the RPA engineer may merely click a button to implement the process in a robot.

Listeners

In order to extract data pertaining to actions taken by users on computing systems 602, 604, 606, listeners 610 may be employed on the client side at the driver level (e.g., drivers 340 of FIG. 3) to extract data from whitelisted applications. For example, listeners 610 may record where a user clicked on the screen and in what application, keystrokes, which button was clicked, instances of the user switching between applications, focus changes, that an email was sent and what the email pertains to, etc. Such data can be used to generate a high-fidelity log of the user's interactions with computing systems 602, 604, 606.

In some embodiments, data may be generated until a desired per-user or total volume of data and/or a maximum recording time (per user or total) is reached. This may constitute a recording goal that may be set for an individual user, for multiple users, or both. In certain embodiments, listeners 610 may stop recording once an individual or group data recording goal is reached. The data may then be uploaded to server 630 and stored in database 640.

In certain embodiments, applications for which user interactions are to be logged may be whitelisted. In other words, only interactions with certain specified applications may be of interest. For instance, interactions with a web browser and an email application may be recorded, but interactions with other applications may be ignored.

In addition to or alternatively to generating log data for process extraction, some embodiments may provide insights into what users are actually doing. For instance, listeners 610 may determine which applications the users are actually using, what percentage of the time users are using a given application, which features within the application the users are using and which they are not, etc. This information may be provided to a manager to make informed decisions regarding whether to renew a license for an application, whether to not renew a license for a feature or downgrade to a less expensive version that lacks the feature, whether a user is not using applications that tend to make other employees more productive so the user can be trained appropriately, whether a user spends a large amount of time performing non-work activities (e.g., checking personal email or surfing the web) or away from his or her desk (e.g., not interacting with the computing system), etc.

In some embodiments, detection updates can be pushed to the listeners to improve their driver-level user interaction detection and capture processes. In certain embodiments, listeners 610 may employ AI in their detection. In certain embodiments, robots implementing processes from automation workflows may automatically be pushed to computing systems 602, 604, 606 via respective listeners 610.

AI Layers

In some embodiments, multiple AI layers may be used. Each AI layer is an algorithm (or model) that runs on the log data, and the AI model itself may be deep learning neural networks (DLNNs) of trained artificial "neurons" that are trained in training data. Layers may be run in series or in parallel.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in a screen or process. For example, one AI layer could perform OCR, another could detect buttons, etc.

Patterns may be determined individually by an AI layer or collectively by multiple AI layers. A probability or an output in terms of a user action could be used. For instance, to determine the particulars of a button, its text, where a user clicked, etc., the system may need to know where the button is, its text, the positioning on the screen, etc.

Subject Matter Expert-Guided Process Extraction

In some embodiments, such as those where the user is interacting with a series of images provided by a virtual machine environment and the actual software with which the user is interacting is executed remotely, or where driver-level data from listeners 610 does not accurately or entirely capture what the user is doing, listeners 610 may capture screenshots of what the user is doing at certain times (e.g., with a predetermined frequency, when a user takes a certain action, a combination thereof, etc.). A subject matter expert (SME) may then review recorded screenshots, save the relevant screenshots, and delete those that are not relevant.

After the relevant screenshots are identified, these screenshots may then be fed through a trained computer vision (CV) model (e.g., executed by server 630 or locally on the user's computing system) that uses AI to identify what the user was doing in the video. Additionally or alternatively, the screenshots may be used to train the CV model for more accurate detection. Once many actions are obtained from multiple users, the identified actions (e.g., clicked buttons, applications that were used, text that was entered, etc.) may then be fed to AI layers 632 to extract processes therefrom. Alternatively, extracted actions from a single user's screenshots could be used to automatically generate a workflow, which the SME may then edit to ensure it is correct in some embodiments. This information may be used in certain embodiments to produce a product definition document (PDD) that contains in substantial detail steps, screenshots, and flowchart(s). Such a PDD could be used for product documentation, for example.

In certain embodiments, scene changes may be detected to produce the PDD. For instance, 20 different activities that a user is performing may be different scenes. The system may then use this information and log data to generate a skeleton robot that can be imported into a developer application, there the developer can then flush out the workflow contents.

Figure 7:
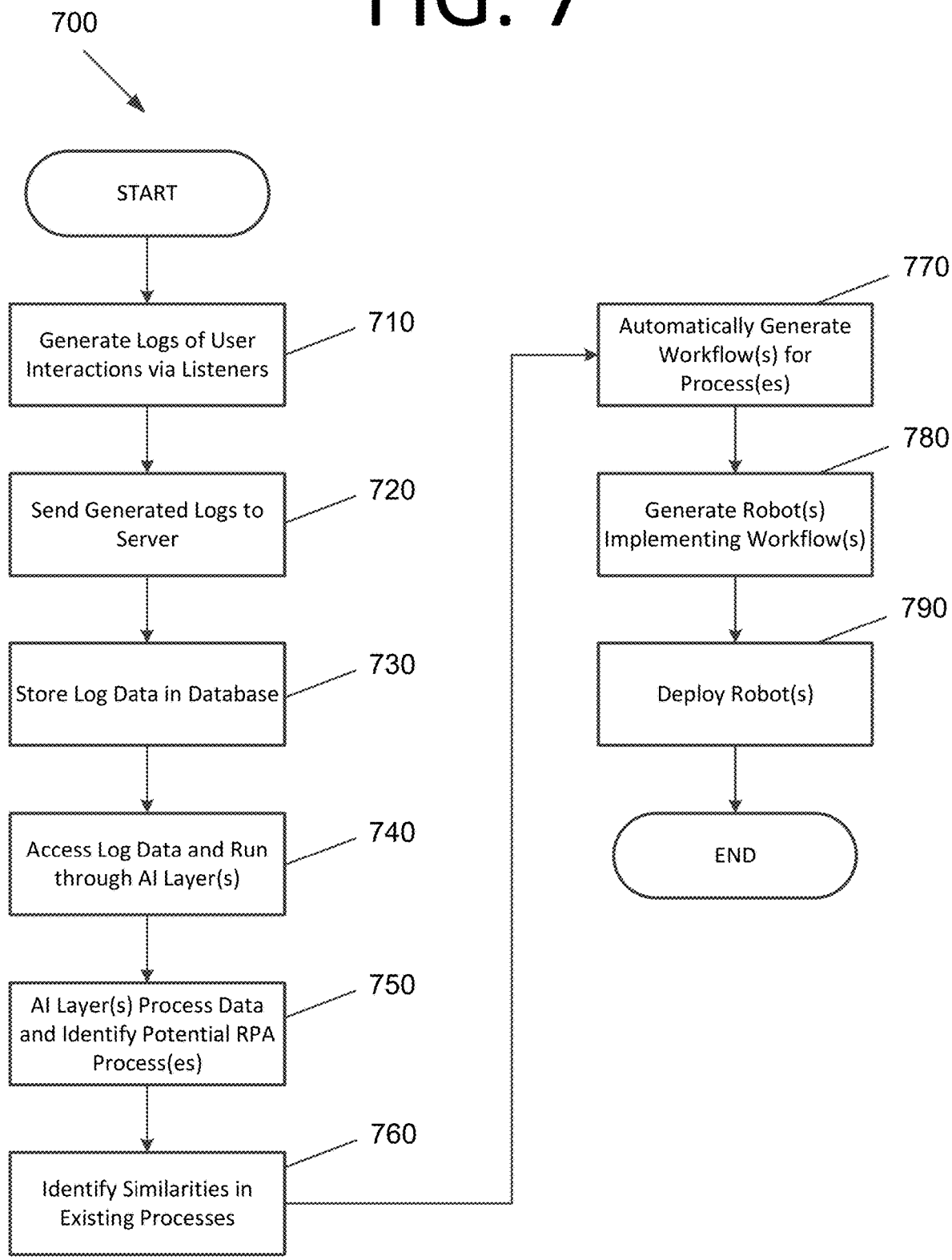
FIG. 7 is a flowchart illustrating a process for AI-based process identification, extraction, and automation for RPA, according to an embodiment of the present invention.

FIG. 7 is a flowchart illustrating a process 700 for AI-based process identification, extraction, and automation for RPA, according to an embodiment of the present invention. The process begins with listener applications (i.e., listeners) generating generate logs of user interactions with their respective computing systems at 710. In some embodiments, the listeners are configured to record where a user clicks on the screen and in what application, keystrokes, which button was clicked, instances of the user switching between applications, focus changes, that an email was sent and what the email pertains to, or any combination thereof. In certain embodiments, the listeners are configured to determine which applications the users are actually using, what percentage of time the users are using a given application, which features within the applications the users are using, which features the users are not using, or any combination thereof. In some embodiments, the listeners are configured to employ AI in detecting user interactions with their computing systems.

In some embodiments, one or more (or potentially all) of the user computing systems are servers. For example, it may be desirable to extract processes for server management by deploying a listener on the server to monitor load balancing, server performance, corrective actions taken by administrators when server issues arise, etc. In this manner, robots may be trained to mimic administrators and automatically remedy issues that administrators typically need to address themselves.

The listeners send the generated log data to the server at 720. In some embodiments, the server or another server runs a conductor application and the log data is sent periodically to the conductor application as part of a heartbeat message. This data may include, but is not limited to, robot uptime, the workflow that is being executed, data pertaining to workflow activities (e.g., a detected total from an invoice) that could be used by a conductor application to provide certain global information in a dashboard (e.g., a total dollar amount processed by a group of robots or all robots of a certain type), etc. The heartbeat message may be sent every 3 seconds, every 5-10 seconds, every minute, or any other suitable time period or range without deviating from the scope of the invention. In certain embodiments, the log data is sent to the server once a predetermined amount of log data has been collected, after a predetermined time period has elapsed, or both. The log data is then stored in a database at 730.

The server accesses the stored log data collected from the listeners and runs the log data through at least one AI layer at 740. In some embodiments, multiple AI layers may be used including, but not limited to, a sequence extraction layer, a clustering detection layer, a visual component detection layer, a text recognition layer, an audio-to-text translation layer, and/or any combination thereof. The AI layer(s) are configured to process the log data and identify potential RPA process(es) therein at 750. More specifically, the identified RPA processes are those capable of automating certain user actions when implemented in an RPA workflow. The server is configured to identify similarities in existing processes implemented by existing robots (if any) at 760. For example, similarities between processes may be determined by a common beginning and end and some amount of statistical commonality in the steps taking in between. The server is then configured to automatically generate workflow(s) including the identified RPA process(es) at 770, generate robot(s) implementing the workflow(s) at 780, and deploy the generated robot(s) at 790 (e.g., by pushing them out to the user's computing systems and executing the robots thereon). If a similar process is implemented by an existing robot, step 790 may include replacing the existing robot with the newly generated robot.

Figure 8:
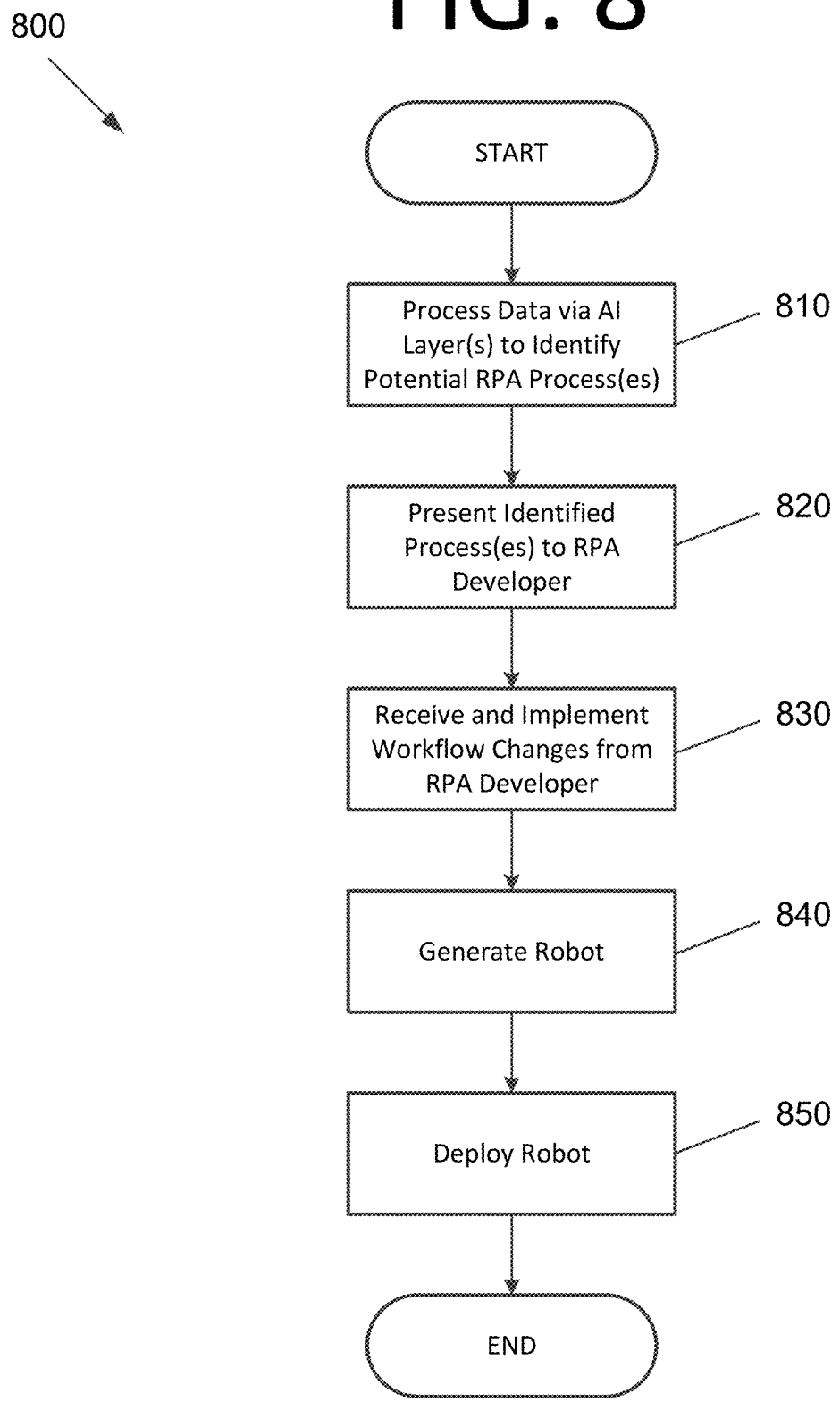
FIG. 8 is a flowchart illustrating a process for developing and deploying RPA workflows based on log data, according to an embodiment of the present invention.

FIG. 8 is a flowchart illustrating a process for developing and deploying RPA workflows based on log data, according to an embodiment of the present invention. The process begins processing data via AI layer(s) to identify potential RPA process(es) at 810. The identified process(es) are then presented to an RPA developer via a designer application on a computing system at 820. The designer application receives and implements changes to the workflow made by the RPA developer at 830. The designer application then generates a robot from the workflow at 840, and the robot is deployed at 850. In some embodiments, deployment may occur via a conductor application running on a server, which is configured to push the robot out to user computing systems. In some embodiments, this workflow deployment is realized via automation manager functionality in the designer application that implements the identified process in the robot responsive to input from the RPA developer.

Figure 9:
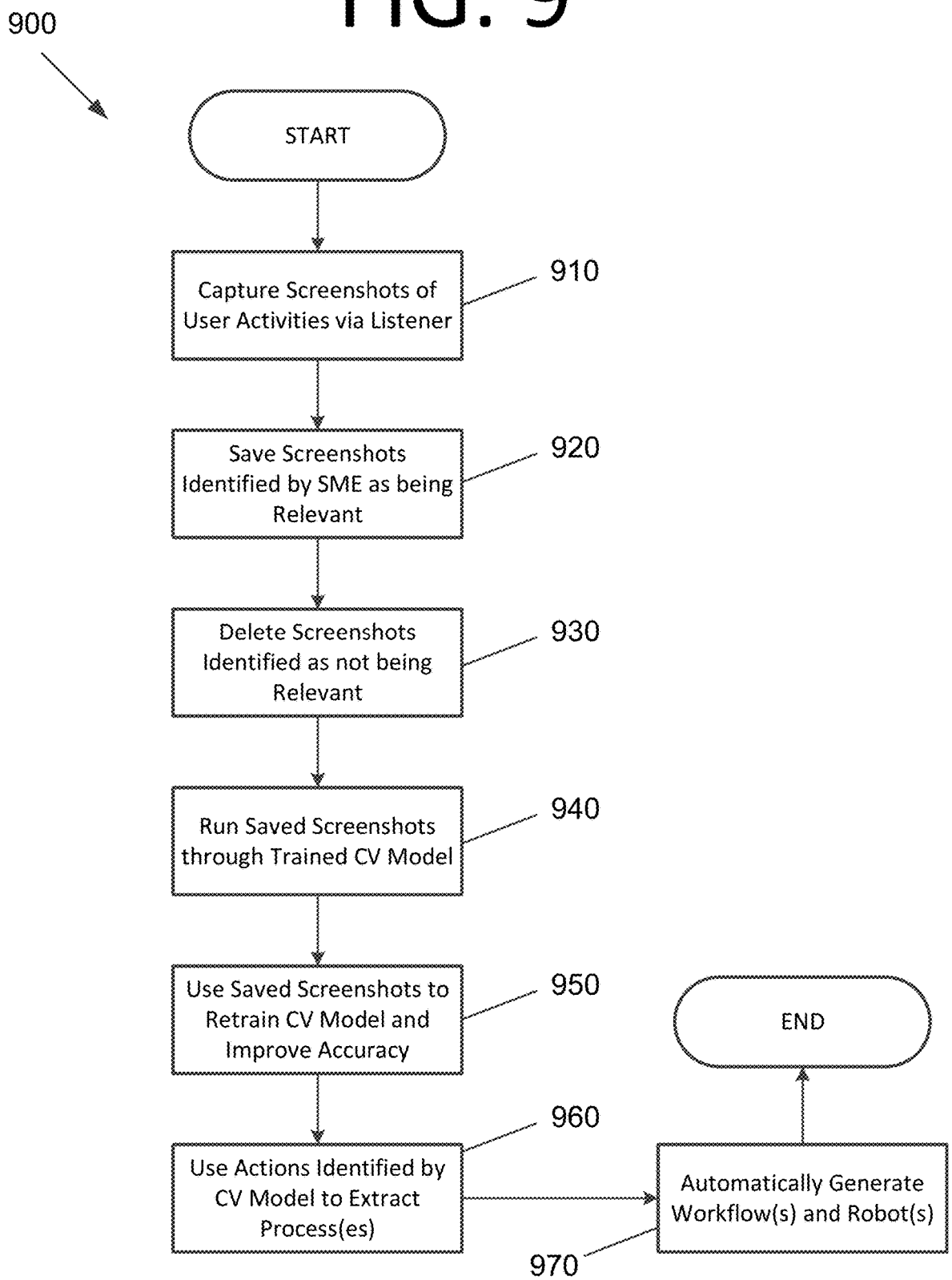
FIG. 9 is a flowchart illustrating a process for subject matter expert (SME)-guided process extraction, according to an embodiment of the present invention.

FIG. 9 is a flowchart illustrating a process for subject matter expert (SME)-guided process extraction, according to an embodiment of the present invention. The process begins with a listener capturing screenshots from a user's computing system while the user interacts with the computing system at 910. In some embodiments, the screenshots may be captured with a predetermined frequency, when a user takes a certain action, or a combination thereof. In certain embodiments, the saved screenshots are part of a video. Screenshots identified by an SME as being relevant are saved at 920 and screenshots identified as not being relevant are deleted at 930. These screenshots may be identified is irrelevant and discarded by the SME, by a trained AI model, by an anomaly detector looking for screenshots that are dissimilar to others that have been identified as relevant, etc.

The saved screenshots are then fed through a trained CV model that uses AI to identify what the user was doing in the saved screenshots at 940. The saved screenshots are also used to train the CV model for more accurate detection at 950. Once actions are identified by the CV model, these actions are fed to one or more AI layers to extract processes therefrom at 960. The extracted process(es) are then used to generate respective workflows(s) and robot(s) at 970.

The process steps performed in FIGS. 7-9 may be performed by a computer program, encoding instructions for the processor(s) to perform at least part of the process(es) described in FIGS. 7-9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7-9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

In an embodiment, a system includes a server and a plurality of user computing systems comprising respective listener applications. The listener applications are configured to generate logs of user interactions with their respective user computing systems and send the log data to the server. The server is configured to access log data collected from the listeners and run the log data through at least one AI layer. In some embodiments, multiple AI layers may be used including, but not limited to, a sequence extraction layer, a clustering detection layer, a visual component detection layer, a text recognition layer, an audio-to-text translation layer, and/or any combination thereof. The at least one AI layer is configured to process the log data and identify a potential RPA process therein. The server is then configured to automatically generate a workflow including the identified RPA process, generate a robot implementing the workflow, and push the generated robot out to the user computing systems to be executed thereon.

In some embodiments, the server or another server runs a conductor application and the log data is sent periodically to the conductor application as part of a heartbeat message. In certain embodiments, the log data is sent to the server once a predetermined amount of log data has been collected, after a predetermined time period has elapsed, or both. In some embodiments, the server stores the received log data from the listeners in a database. In certain embodiments, the server is configured to find similarities between a previously existing RPA process executed by a robot on the user computing systems and replace the previously existing robot with the generated robot.

In some embodiments, the listeners are configured to record where a user clicks on the screen and in what application, keystrokes, which button was clicked, instances of the user switching between applications, focus changes, that an email was sent and what the email pertains to, or any combination thereof. In certain embodiments, the listeners are configured to determine which applications the users are actually using, what percentage of time the users are using a given application, which features within the applications the users are using, which features the users are not using, or any combination thereof. In some embodiments, the listeners are configured to employ AI in detecting user interactions with their computing systems.

In another embodiment, a computer-implemented method includes processing data, by a server, via at least one AI layer to identify one or more potential RPA processes. The computer-implemented method also includes receiving the identified potential RPA processes and presenting the one or more identified RPA processes to a developer, via a designer application on a developer computing system. The computer-implemented method further includes receiving and implementing changes to the workflow, by the designer application. Additionally, the computer-implemented method includes generating a robot from the workflow, by the designer application. The robot may then be deployed to one or more user computing systems. In some embodiments, deployment may occur via a conductor application running on a server, which is configured to push the robot out to user computing systems. In some embodiments, this workflow deployment is realized via automation manager functionality in the designer application that implements the identified process in the robot responsive to input from the RPA developer.

In yet another embodiment, a computer-implemented method includes capturing screenshots, by a listener on a user computing system, while a user interacts with the user computing system. In some embodiments, the screenshots may be captured with a predetermined frequency, when a user takes a certain action, or a combination thereof. In certain embodiments, the saved screenshots are part of a video. The computer-implemented method also includes saving screenshots of the captured screenshots that are marked as relevant and deleting screenshots of the captured screenshots identified as irrelevant. The computer implemented method further includes feeding the saved screenshots through a trained CV model that uses AI to identify what the user was doing in the saved screenshots and feeding the identified actions to one or more AI layers to extract one or more processes therefrom. In some embodiments, the saved screenshots are also used to train the CV model for more accurate detection in the future. Additionally, the computer-implemented method includes using the one or more extracted processes to generate one or more respective workflows and robots.

The invention claimed is:

1. A cloud robotic process automation (RPA) system, comprising:
   one or more cloud computing systems configured to perform artificial intelligence (AI)-based process identification, extraction, and automation for RPA; and
   a plurality of user computing systems comprising respective listener applications, the listener applications configured to generate logs comprising user interactions with respective user computing systems and send log data from the logs to the one or more cloud computing systems, wherein
   the one or more cloud computing systems are configured to:
   access log data collected from the listeners and run the log data through at least one AI layer, the at least one AI layer configured to process the log data and identify a potential RPA process therein, and
   automatically generate an RPA workflow including the identified RPA process.

2. The cloud RPA system of claim 1, wherein the one or more cloud computing systems are further configured to:
   generate an RPA robot implementing the RPA workflow; and
   push the generated RPA robot out to the user computing systems to be executed thereon.

3. The cloud RPA system of claim 1, wherein the at least one AI layer comprises a sequence extraction layer, a clustering detection layer, a visual component detection layer, a text recognition layer, an audio-to-text translation layer, or any combination thereof.

4. The cloud RPA system of claim 1, wherein
   the one or more cloud computing systems comprise a conductor application, and
   the log data is sent periodically to the conductor application by the listeners of the plurality of user computing systems as part of a heartbeat message.

5. The cloud RPA system of claim 1, wherein the log data is sent to the one or more cloud computing systems once a predetermined amount of log data has been collected, after a predetermined time period has elapsed, or both.

6. The cloud RPA system of claim 1, further comprising:
   a database communicably coupled to the one or more cloud computing systems, wherein
   the one or more cloud computing systems are configured to store the received log data from the listeners in the database.

7. The cloud RPA system of claim 1, wherein the one or more cloud computing systems are further configured to:
   determine similarities between the identified RPA process and a previously existing RPA process executed by an RPA robot on the user computing systems; and
   replace an RPA workflow of the RPA robot executing the previously existing RPA process with the identified RPA process.

8. The cloud RPA system of claim 7, wherein similarities between the identified RPA process and the previously existing RPA process are determined by a common beginning, a common end, and a predetermined amount of statistical commonality in steps taking in between in the RPA processes.

9. The cloud RPA system of claim 1, wherein the listeners are configured to record where a user clicks on a screen and in which application, keystrokes, which button was clicked, instances of the user switching between applications, focus changes, that an email was sent and what the email pertains to, or any combination thereof.

10. The cloud RPA system of claim 1, wherein the listeners are configured to determine which applications users of the user computing systems are using, what percentage of time the users are using a given application, which features within the applications the users are using, which features within the applications that the users are not using, or any combination thereof.

11. A computer program configured to perform artificial intelligence (AI)-based process identification, extraction, and automation for robotic process automation (RPA) embodied on a non-transitory computer-readable medium of a cloud computing system, the computer program configured to cause at least one processor to:
   access log data collected via a cloud RPA system from respective listener applications of a plurality of user computing systems;
   run the log data through at least one AI layer, the at least one AI layer configured to process the log data and identify a potential RPA process therein, and
   automatically generate an RPA workflow including the identified RPA process.

12. The computer program of claim 11, wherein the computer program is further configured to cause the at least one processor to:
   generate an RPA robot implementing the RPA workflow; and
   push the generated robot out to the user computing systems, via the cloud RPA system, to be executed thereon.

13. The computer program of claim 11, wherein the at least one AI layer comprises a sequence extraction layer, a clustering detection layer, a visual component detection layer, a text recognition layer, an audio-to-text translation layer, or any combination thereof.

14. The computer program of claim 11, wherein the computer program is further configured to cause the at least one processor to:

determine similarities between the identified RPA process and a previously existing RPA process executed by a robot on the user computing systems; and replace an RPA workflow of the robot executing the previously existing RPA process with the identified RPA process, via the cloud RPA system.

15. The computer program of claim 11, wherein similarities between the identified RPA process and the previously existing RPA process are determined by a common beginning, a common end, and a predetermined amount of statistical commonality in steps taking in between in the RPA processes.

16. A computer-implemented method for performing artificial intelligence (AI)-based process identification, extraction, and automation for robotic process automation (RPA), comprising:

generating, by a listener, a log comprising user interactions with a user computing system; and sending log data from the log to one or more cloud computing systems of a cloud RPA system, by the listener, wherein the log data comprises where a user clicks on a screen and in which application, keystrokes, which button was clicked, instances of the user switching between applications, focus changes, that an email was sent and what the email pertains to, or any combination thereof.

17. The computer-implemented method of claim 16, wherein the log data is sent periodically to a conductor application of the one or more cloud computing systems, via the cloud RPA system, as part of a heartbeat message.

18. The computer-implemented method of claim 16, wherein the log data is sent to the one or more cloud computing systems, via the cloud RPA system, once a predetermined amount of log data has been collected, after a predetermined time period has elapsed, or both.

19. The computer-implemented method of claim 16, wherein the user interactions comprise which applications the user is using, what percentage of time the user is using a given application, which features within the applications the user is using, which features within the applications that the user is not using, or any combination thereof.

20. The computer-implemented method of claim 16, wherein the user interactions comprise which features within the applications the user is using and which features within the applications that the user is not using.

\* \* \* \* \*